US012684032B2

(12) United States Patent
Aneja et al.

(10) Patent No.: US 12,684,032 B2
(45) Date of Patent: Jul. 14, 2026

(54) WEBHOOK REGISTRATION USING A RAPID APPLICATION BUILDING PLATFORM

(71) Applicant: Oracle International Corporation, Redwood Shores, CA (US)

(72) Inventors: Sumit Aneja, Haridwar (IN); Anuj Kaushal, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 18/807,632

(22) Filed: Aug. 16, 2024

(65) Prior Publication Data

US 2026/0052176 A1     Feb. 19, 2026

(51) Int. Cl.
| | |
|---|---|
| *H04L 67/02* | (2022.01) |
| *G06F 15/16* | (2006.01) |
| *G06F 17/30* | (2006.01) |
| *G06F 40/10* | (2020.01) |
| *H04L 9/40* | (2022.01) |
| *H04L 15/16* | (2006.01) |
| *H04L 29/06* | (2006.01) |
| *H04L 51/02* | (2022.01) |

(52) U.S. Cl.
CPC .............. *H04L 67/02* (2013.01); *H04L 63/08* (2013.01)

(58) Field of Classification Search
CPC ................................. H04L 67/02; H04L 63/08

USPC .......................................................... 709/203
See application file for complete search history.

(56) References Cited

U.S. PATENT DOCUMENTS

| | | | | |
|---|---|---|---|---|
| 11,271,987 | B1 * | 3/2022 | Diwakaran ........... | H04L 67/147 |
| 2017/0118262 | A1 * | 4/2017 | Patel ..................... | H04L 51/224 |
| 2018/0115595 | A1 * | 4/2018 | Krishnan .............. | H04L 67/025 |
| 2019/0306167 | A1 * | 10/2019 | LaManna .............. | G06Q 50/01 |
| 2020/0119910 | A1 * | 4/2020 | Ojha .................... | G06F 16/2465 |
| 2021/0106916 | A1 * | 4/2021 | Khan ................... | A63F 13/216 |
| 2021/0344775 | A1 * | 11/2021 | Kulkarni .............. | H04L 67/133 |
| 2022/0353263 | A1 * | 11/2022 | Choyi .................... | H04L 12/12 |

* cited by examiner

*Primary Examiner* — Berhanu Shitayewoldetsadik
(74) *Attorney, Agent, or Firm* — Invoke

(57)     ABSTRACT

Techniques for webhook registration are disclosed, including: receiving, by an integration platform, a metadata document associated with a producer, wherein the metadata document describes (a) a set of conditions for identifying webhook validation requests and (b) a set of one or more operations for validating webhook validation requests; instantiating, by the integration platform, an adapter based on the metadata document; determining, by the integration platform using the adapter, that a request from a producer satisfies the set of conditions for identifying webhook validation requests; responsive to determining that the validation request satisfies the set of conditions for identifying webhook validation requests: executing the set of one or more operations for validating webhook validation requests, to validate a registration of a consumer with the producer.

20 Claims, 5 Drawing Sheets

100

200

WEBHOOK REGISTRATION USING A RAPID APPLICATION BUILDING PLATFORM

TECHNICAL FIELD

The present disclosure relates to webhooks. In particular, the present disclosure relates to webhook registration.

BACKGROUND

Webhooks are hypertext transfer protocol (HTTP) callbacks that are triggered by specific events. Using webhooks, a producer (e.g., a server-side application) can notify a consumer (e.g., a client-side application) when an event of interest to the consumer has occurred on the producer side. Webhooks use push-based event notifications. The consumer supplies an endpoint (e.g., a uniform resource locator) to the producer. When an event of interest occurs on the producer side, the producer transmits an event notification to the endpoint provided by the consumer (e.g., in the form of an HTTP request). The consumer can then perform actions based on the event notification. Webhooks are more efficient than pull-based event notifications that require the consumer to continuously poll the producer to discover new events. However, webhook registration can be a complicated process, with different requirements to be satisfied depending on the specific producer and consumer involved.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE SYSTEM
  2.1. SYSTEM COMPONENTS
  2.2. DATA STORAGE
  2.3. USER INTERFACE
  2.4. TENANTS
  2.5. MACHINE LEARNING
3. RAB FRAMEWORK
  3.1. EXAMPLE SYSTEM
  3.2. EXAMPLE RAB ENGINE
4. WEBHOOK REGISTRATION
5. EXAMPLE EMBODIMENT
6. PRACTICAL APPLICATIONS, ADVANTAGES & IMPROVEMENTS
7. COMPUTER NETWORKS AND CLOUD NETWORKS
8. MICROSERVICE APPLICATIONS
9. HARDWARE OVERVIEW
10. MISCELLANEOUS; EXTENSIONS

1. General Overview

One or more embodiments provide webhook registration using a rapid application building (RAB) platform. Specifically, one or more embodiments generate a webhook adapter using a metadata-driven RAB platform. A metadata document defines (a) a set of conditions for identifying webhook validation requests and (b) a set of one or more operations for validating webhook validation requests. The RAB platform uses the metadata document to implement an adapter. Once live, the adapter supports a webhook registration process whereby a consumer is registered to receive event notifications from a producer at a registered webhook endpoint. Metadata-driven approaches described herein provide a low-code/no-code solution that does not require the developer to write custom logic.

One or more embodiments described in this Specification and/or recited in the claims may not be included in this General Overview section.

2. Example System 2.1. System Components

Figure 1:
FIG. 1 illustrates a system in accordance with one or more embodiments.
Figure 1:
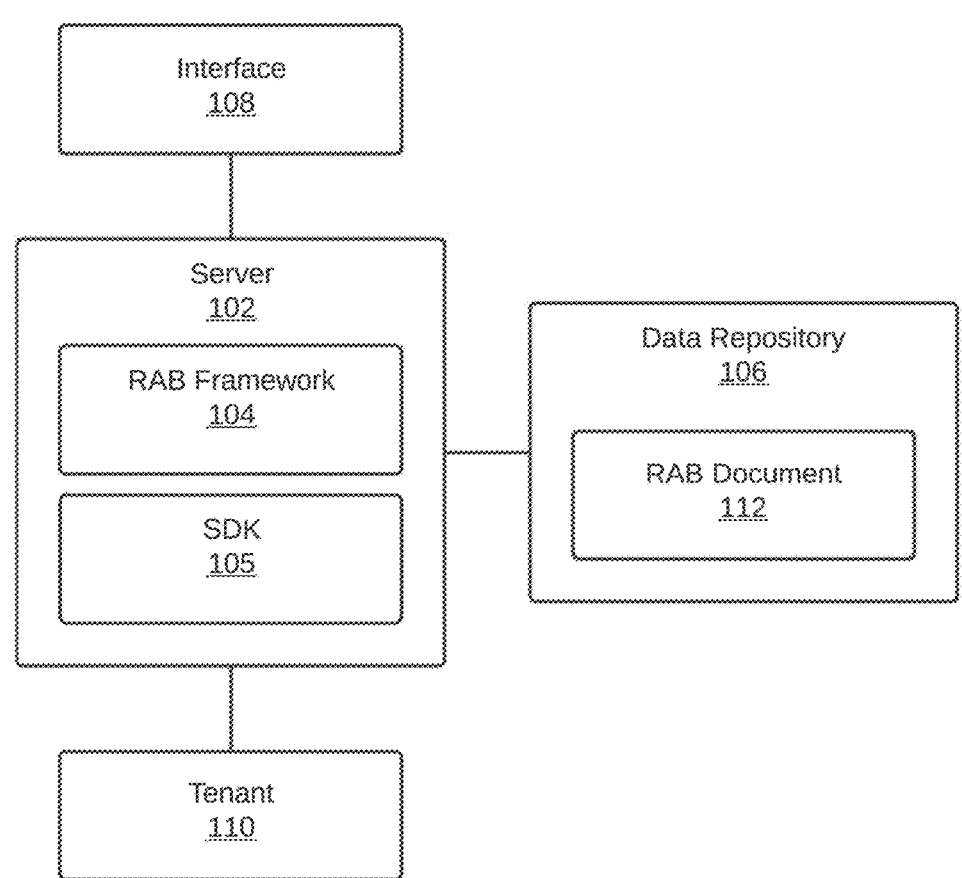

FIG. 1 illustrates an example of a system 100 in accordance with one or more embodiments. As illustrated in FIG. 1, the system 100 includes server 102, data repository 106, interface 108, and one or more tenants 110. Server 102 includes RAB framework 104 and SDK 105. Data repository 106 includes one or more RAB documents 112. Each of these components is described in further detail below.

In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In an embodiment, server 102 refers to hardware and/or software configured to perform operations for metadata-driven rapid adapter building, examples of which are described below. Specifically, server 102 includes RAB framework 104, which functions as a logical wrapper over SDK 105 as described herein. An example of RAB framework 104 is described in further detail below with reference to FIG. 2. RAB framework 104 is configured to use one or more RAB documents 112.

An RAB document 112 is a metadata document that defines an adapter, as described in further detail herein. Specifically, RAB document 112 includes metadata that describes functionality to override one or more SDK functions. RAB document 112 may be an extensible markup language (XML) file, JavaScript object notation (JSON) file, and/or other kind of structured file configured to store metadata. In an embodiment, RAB document 112 includes metadata written to a specification supported by extension hooks provided RAB framework 104. Some examples of extension hooks are described in further detail below.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

In an embodiment, a data repository 106 is any type of storage unit and/or device (e.g., a file system, database, collection of tables, and/or any other storage mechanism) for storing data. As illustrated in FIG. 1, the data repository 106 may be configured to store one or more RAB documents 112.

The data repository 106 may include multiple different storage units and/or devices. The multiple different storage units and/or devices may or may not be of the same type or located at the same physical site. The data repository 106 may be implemented or executed on the same computing system as RAB framework 102, and/or on a computing system separate from RAB framework 102. The data repository 106 may be communicatively coupled to RAB framework 102 via a direct connection or via a network. Information describing RAB framework 102 may be implemented across any of the components of the system 100. However, this information is illustrated within the data repository 106 for purposes of clarity and explanation.

2.3. User Interface

In an embodiment, interface 108 refers to hardware and/or software configured to facilitate communications between a user and RAB Framework 102. Interface 108 renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of interface 108 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 108 is specified in one or more other languages, such as Java, Python, C, or C++.

2.4. Tenants

In an embodiment, a tenant 110 is a corporation, organization, enterprise, or other entity that accesses a shared computing resource, such as RAB framework 102. The system 100 may include multiple tenants 110 that are independent from each other, such that a business or operation of one tenant is separate from a business or operation of another tenant.

2.5. Machine Learning

In an embodiment, a machine learning algorithm is an algorithm that can be iterated to learn a target model that best maps a set of input variables to one or more output variables, using a set of training data. The training data includes datasets and associated labels. The datasets are associated with input variables for the target model. The associated labels are associated with the output variable(s) of the target model. The training data may be updated based on, for example, feedback on the accuracy of the current target model. Updated training data may be fed back into the machine learning algorithm, which may in turn update the target model.

The machine learning algorithm may generate the target model such that the target model best fits the datasets of the training data to the labels of the training data. Specifically, the machine learning algorithm may generate the target model such that when the target model is applied to the datasets of the training data, a maximum number of results determined by the target model match the labels of the training data. Different target models may be generated based on different machine learning algorithms and/or different sets of training data.

The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

3. Rab Framework

As noted above, an RAB framework functions as a logical wrapper over an SDK. The RAB framework translates the extension points provided by the SDK into hooks defined by certain keys in the metadata document. Some of these extensions may be broadly defined (e.g., adapter endpoint configuration pages) while other extensions may be more narrowly defined (for example, outbound overrides). The more narrowly defined extensions allow for overriding portions of the SDK with a relatively narrow contract. For example:

One or more embodiments support configuration pages, accessible through a UI, for configuring adapters. In prior approaches, developers were required to code these pages themselves, including the relationships between the pages and the in-page functionality (e.g., using the Java programming language). These prior approaches allowed developers considerable freedom over page configuration but introduced considerable complexity and required the introduction of custom code. Instead of allowing adapter developers to declare any pages and child pages they like, one or more embodiments define a set collection of pages for adapters to comply with. Some pages may be required and others may be optional, depending on the endpoint configuration functionality required. One or more embodiments may be configured to generate these pages dynamically, without requiring custom coding, based on the relationships between elements defined in the RAB document(s).

For metadata retrieval and binding to UI components for configuration, retrieving metadata from a third party depends on the API exposed. However, in an embodiment, the mapping of the returned values to the UI components is standardized and bound to the UI components with an interface.

Instead of allowing developers to define their own set of settings in a configuration file, in an embodiment, generating a configuration file follows a string contract with some values that support certain specific extensions. For example, a configuration field of a configuration file may model all the selections of the user from the endpoint configuration process according to a specific structure.

For runtime, the metadata adapter may invoke a flow that permits an RAB adapter developer to control the data and the style that would be used to call the third-party endpoint, using CNCF flow and pre-build JQ callable functions exclusively. As used herein, the term "JQ" refers to the JSON processor also known as "./jq." One or more embodiments may use another metadata processor, and embodiments should not be considered limited to those that use JQ.

In an embodiment, an RAB adapter "engine" can read the metadata document that models an adapter and execute the corresponding instructions according to the model, to drive both design-time configuration and runtime execution. The structure that defines an adapter is expressed in metadata (e.g., JSON metadata). The metadata adapter engine may support extension of certain areas of the template, to permit the adapter developer to customize the behavior using a set of built-in functions and/or through JQ expressions.

In an embodiment, the RAB framework narrowly defines what can be used to extend each of the areas for which extensions are permitted. In this way, the RAB adapter engine functions as a wrapper around the existing adapter SDK, where the existing extension points are redefined to allow only specific patterns and mechanisms for overrides.

Using the adapter SDK, an adapter developer may add custom logic in addition to the standard logic provided by the SDK. The extension points allow the adapter developer to insert their custom logic that makes an adapter specific to the target with which it integrates.

3.1. Example System

Figure 2:
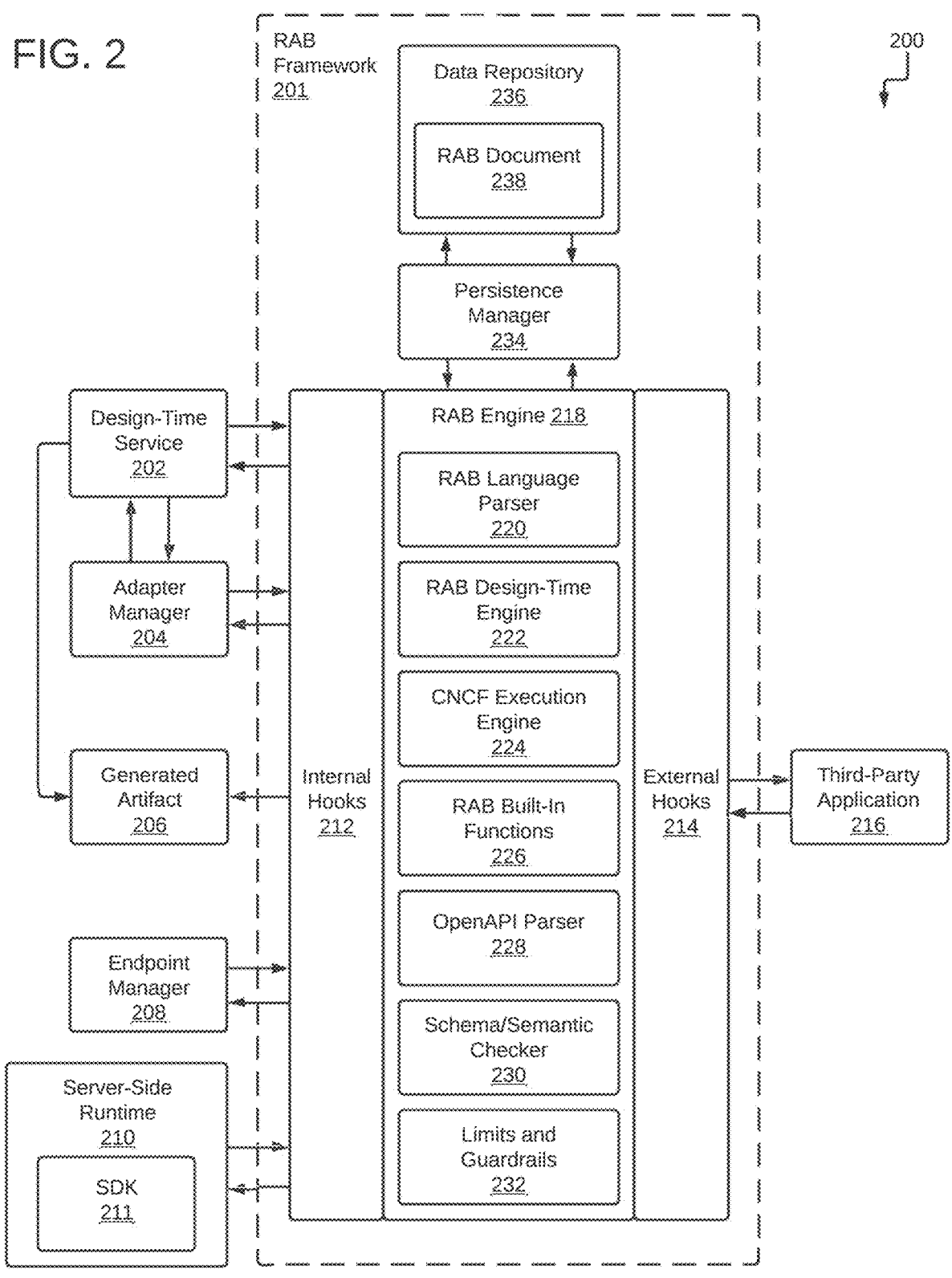
FIG. 2 illustrates a system in accordance with one or more embodiments.

FIG. 2 illustrates a system 200 in accordance with one or more embodiments. System 200 includes various components, each of which is described in further detail below. In an embodiment, system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In an embodiment, system 200 includes RAB framework 201. RAB framework 201 is configured to perform operations for rapid adapter building (RAB) as described in further detail herein.

In an embodiment, system 200 includes design-time service 202. Design-time service 202 is configured to generate UI elements for configuring adapters. Specifically, one or more embodiments are configured to generate configuration pages dynamically, without requiring custom coding, based on the relationships between elements defined in the RAB document(s).

In an embodiment, system 200 includes adapter manager 204. Adapter manager 204 is configured to satisfy design-time configuration user interface requests, from the design-time server to individual adapter services. In an embodiment, this approach allows the design-time to operate without requiring specific knowledge about particular adapter services.

In an embodiment, system 200 includes one or more generated artifacts 206. A generated artifact 206 refers to a set of artifacts, modeled as configuration and schema files, that capture the user selections and configurations needed for the RAB framework 201 to (1) interpret requests from the server-side runtime 210 and call the corresponding third-party application 216 endpoint(s) and/or (2) interpret requests from third-party application 216 events and translate them to a canonical form that the server-side runtime 210 can process.

In an embodiment, system 200 includes endpoint manager 208. Endpoint manager 208 is configured to stand up endpoints for incoming messages from third-party applications 216, for the server-side runtime 210 to receive messages, relying on generated artifacts 206 for the contract to stand up for ingress of application events.

In an embodiment, system 200 includes server-side runtime 210. Server-side runtime 210 refers to a "live" runtime environment that includes an SDK 211 and is configured to execute functions defined by the SDK 211. RAB framework 201 functions as a logical wrapper around the SDK 211, as described herein. RAB framework 201 allows extension of certain points in the SDK 211, to allow more than simply invoking a third-party endpoint (i.e., more than simply "pass-through" invocations). For example, an RAB developer may add custom logic to handle an inbound message from server-side runtime 210, and format and/or transform the payload into a format that the endpoint expects, which may include different encoding. A CNCF flow that supports this behavior may rely on out-of-the-box functions exposed by RAB framework 201. Many different environments include a server-side runtime 210. For example, Oracle Integration Cloud (OIC) includes a server-side runtime 210.

In an embodiment, RAB framework 201 includes internal hooks 212. Internal hooks 212 are configured to allow developers to customize and/or override default behavior, for an action attached to the respective hook, based on the requirement(s) of a third-party application 216 for an adapter. In an embodiment, internal hooks 212 include one or more of the following. The names assigned to these hooks are for illustrative purposes only and should not be construed as limiting the scope of one or more embodiments:

1. A connection handling processing hook for customizing the requirements of the connection endpoint for the third-party application 216, such as the actual endpoint formulation for an adapter (e.g., the specific protocol needed to communicate with the third-party application 216). In an embodiment, the RAB framework 201 allows the modeling of this customization by using a JSON-based metadata model and dynamically instancing generic code that can drive this behavior.

2. A security policy processing hook for customizing the behavior of an adapter's authentication and authorization to a third-party application 216, which may vary depending on the third-party service. In an embodiment, the RAB framework 201 allows the modeling of this customization by using a JSON-based metadata model and dynamically instancing generic code that can drive this behavior.

3. A user interface metadata engine processing hook for customizing (1) the behavior of generating browser-friendly metadata that can be rendered by a web client into configuration UI components and/or (2) the behaviors between the UI components, based on the metadata model stored on the server for an adapter. In an embodiment, the RAB framework 201 allows the modeling of this customization by using a JSON-based metadata model and dynamically instancing generic code that can drive this behavior.

4. An "artifact generation" hook for customizing the set of files that capture the design-time configuration settings, options, and/or schema definitions defined by the user for the action to be conducted at runtime by the server-side runtime 210. In an embodiment, the RAB framework 201 allows the modeling of this customization by using a JSON based metadata model and dynamically instancing generic code that can drive this behavior.

5. An integration activation processing hook for customizing the preparation needed before making the adapter ready (i.e., "activating" the adapter) to either (1) receive events from the third party application 216 or (2) accept request from the integration process to conduct actions against the third party application 216 based on the desired adapter behavior. In an embodiment, the RAB framework 201 allows the modeling of this customization by using a JSON-based metadata model and dynamically instancing generic code that can drive this behavior.

6. An inbound message receiver processing hook for customizing the processing of the request that is received by the adapter from the third party application 216, based on the desired adapter behavior. In an embodiment, the RAB framework 201 allows the modeling of this customization by using a JSON-based metadata model and dynamically instancing generic code that can drive this behavior.

7. An outbound message handler processing hook for customizing the processing of the request from the integration engine to be conducted on the third-party application 216. In an embodiment, the RAB framework 201 allows the modeling of this customization by using a JSON-based metadata model and dynamically instancing generic code that can drive this behavior.

In an embodiment, RAB framework 201 includes external hooks 214. External hooks 214 are configured to allow an adapter to customize and/or override the default behavior provided by the adapter SDK, to implement the specific behavior desired by an adapter. In an embodiment, external hooks 214 include one or more of the following:

1. An "outbound override" hook for customizing the processing of the request from the integration engine to be conducted on the third-party application 216, as well as the specific requirements of the protocol supported by the third-party endpoint.

2. A "subscription" hook for customizing the requirements of the third-party application 216 for sending events to an adapter, which may include API calls to the third-party application 216 to register for an event.

3. A "security context injection" hook for customizing the authentication and authorization artifact during runtime when making an outbound API call to the third-party application 216, which may vary by third-party applications 216.

In an embodiment, system 200 includes third-party application 216. Third-party application 216 is provided by an entity other than the entity that provides RAB framework 201. In an embodiment, one or more adapters, defined by one or more RAB documents 238, are configured to mediate between server-side runtime 210 and third-party application 216.

In an embodiment, system 200 includes RAB engine 218. RAB engine 218 is configured to perform operations for processing data received via internal hooks 212 and/or external hooks 214. Specifically, RAB engine 218 is configured to process data according to adapter functionality defined in one or more RAB documents 238. Example components of RAB engine 218 in accordance with one or more embodiments are described in further detail below.

In an embodiment, RAB framework 201 includes persistence manager 234. Persistence manager 234 is configured to durably save information into a data store such as a database or object store.

In an embodiment, RAB framework 201 includes a data repository 236 configured to store one or more RAB documents 238. Example embodiments of a data repository 236 and RAB documents 238 are discussed in further detail herein.

3.2. Example Rab Engine

In an embodiment, CNCF defines the metadata language that describes various capabilities. RAB engine 218 implements core execution functionality of RAB framework 201, as used in both design-time and runtime. In an embodiment, for design-time, every time a user clicks a UI option that needs to pull data from the third party and display data for user selection, RAB engine 218 executes a CNCF flow bound to the UI component, to retrieve the data. At design-time, responsive to a custom object selection, one or more embodiments execute a CNCF flow bound to the input property, thus driving a dynamic schema based on the custom object selection.

Instead of allowing developers to model individual endpoint configuration pages (e.g., as Java classes) and UI components as object declarations within the pages' definitions (e.g., within Java classes), one or more embodiments drive the instantiation of the objects and the defining of their dependencies through a metadata document (e.g., a JSON document).

In an embodiment, RAB engine 218 includes RAB language parser 220. RAB language parser 220 is configured to interpret the metadata language vocabulary and grammar and create a memory model for the RAB document 238, in a form that can be processed programmatically.

In an embodiment, RAB engine 218 includes RAB design-time engine 222. RAB design-time engine 222 is configured to interpret the design-time portion of the RAB document model, drive the creation of the design UI components and their dependency behaviors with each other, and use them to generate the artifacts 206 that are used during runtime.

In an embodiment, RAB engine 218 includes CNCF execution engine 224. CNCF execution engine 224 is configured to execute the logic of the adapter that is defined in the RAB document 238, which includes executing the series of steps modeled as a series of states in a flow compliant with CNCF serverless workflow, to drive the desired behavior of the adapter.

In an embodiment, RAB engine 218 includes RAB built-in (a.k.a. pre-built) functions 226. RAB built-in functions 226 are configured to provide a set of common functions provided by the RAB framework 201, backed by code constructs that are difficult to model in CNCF, to achieve the processing behavior required of an adapter.

In an embodiment, RAB engine 218 includes OpenAPI parser 228. OpenAPI parser 228 is configured to parse OpenAPI into a memory model that can be transferred and processed the RAB framework 201 in CNCF states.

In an embodiment, RAB engine 218 includes schema/semantic checker 230. Schema/schematic checker 230 is configured to provide the RAB document 238 author a way to check the syntax and semantic validity of the RAB document 238's vocabulary and grammar.

In an embodiment, RAB engine 218 includes limits and guardrails 232. Limits and guardrails 232 are configured to provide checks against RAB metadata document 238 authors from modeling behavior that affect the adapter, the RAB framework 201, or the integration process in an adverse way, whether inadvertently or maliciously, such as infinite looping, data siphoning to unintended destinations, and/or insecure protocol usage.

Additional information about RAB platforms is described in U.S. patent application Ser. No. 18/612,994, titled "Metadata-Driven Rapid Adapter Building," hereby incorporated herein in its entirety by reference.

4. Webhook Registration

In general, to register a webhook, a consumer sets up a webhook client endpoint to receive notifications from a publisher. The webhook endpoint is reachable by the publisher. For example, the webhook endpoint may be a publicly accessible URL. The publisher may impose requirements on the webhook endpoint. For example, the publisher may impose requirements with respect to the URL pattern, method, headers, payload, authentication, etc. used by the consumer's webhook endpoint. The consumer registers the webhook endpoint with the producer (e.g., using a user interface and/or API provided by the producer), according to the producer's requirements (also referred to as a producer "contract").

Different producers may impose different webhook registration requirements. Some producers may generate a credential upon registration that is securely exchanged with the consumer. Other producers may require out-of-band generation of a shared secret that is made available to both the producer and the consumer. Some producers further impose configuration requirements such as a retry policy, a backoff policy, limits on numbers and frequency of attempts, etc. These configuration requirements may determine, at least in part, the conditions in which failed event notifications may be retransmitted to the consumer.

As part of webhook registration, a producer may validate the consumer's webhook endpoint to ensure that event notifications can be delivered successfully. A producer may transmit a pre-flight "dummy" event notification (also referred to as a validation request or ping) to validate that the consumer's webhook endpoint is active and accepting event notifications. The dummy event notification may include specific predetermined features to indicate that the notification is for verification purposes. For example, the dummy event notification may use an HTTP method, header, and/or payload that is/are different from an actual event notification.

A producer may impose well-defined requirements on the consumer for how to handle a dummy event notification. For example, the producer may require the consumer to authenticate the producer and return an acceptance message (e.g., an HTTP 202 response). The consumer is not required to process the dummy event notification as it would an actual event notification. The producer may expose an API for this purpose; the consumer may authenticate the producer and transmit an out-of-band callback request to the producer API. The callback request includes correlation information about the dummy event notification and consumer, thereby acknowledging the verification.

In addition, a consumer may need to successfully validate that incoming event notifications and/or requests originate from the intended producer. A consumer may use various techniques for authenticating a producer, such as basic authentication, signature-based authentication, etc.

When validation is complete, the producer treats the consumer as a subscriber and may begin producing actual event notifications. The consumer's webhook endpoint may authenticate actual event notifications in a manner similar to authenticating a dummy event notification. In addition, in response to an event notification, the webhook endpoint triggers a consumer-side business integration flow to process the noticed event.

Because of variations in authentication schemes between different producers, non-adapter-driven approaches do not provide a generic webhook registration solution that applies to a broad set of producers. An integration platform may include support for consumers to register webhook endpoints with multiple producers. However, different producers may require different pre-built adapters that are programmed to handle the producer-specific nuances. If an adapter is not already available, then implementing a webhook pattern for a particular producer is a bespoke process that requires technical expertise, custom modeling, and manual steps. Specifically, an integration developer configures a webhook endpoint and transmits a request for registration metadata to the integration platform. The integration platform responds to the request with registration metadata. The consumer uses the registration metadata to register the webhook endpoint with a producer. The producer replies with a registration response. The consumer uses information from the registration response to update the webhook endpoint with the integration platform. The producer transmits a verification request to the integration platform. The integration platform captures the request and the consumer transmits an out-of-band acknowledgement of the verification request to the producer.

4.1. Webhook Registration Using an Rab Platform

Figure 3:
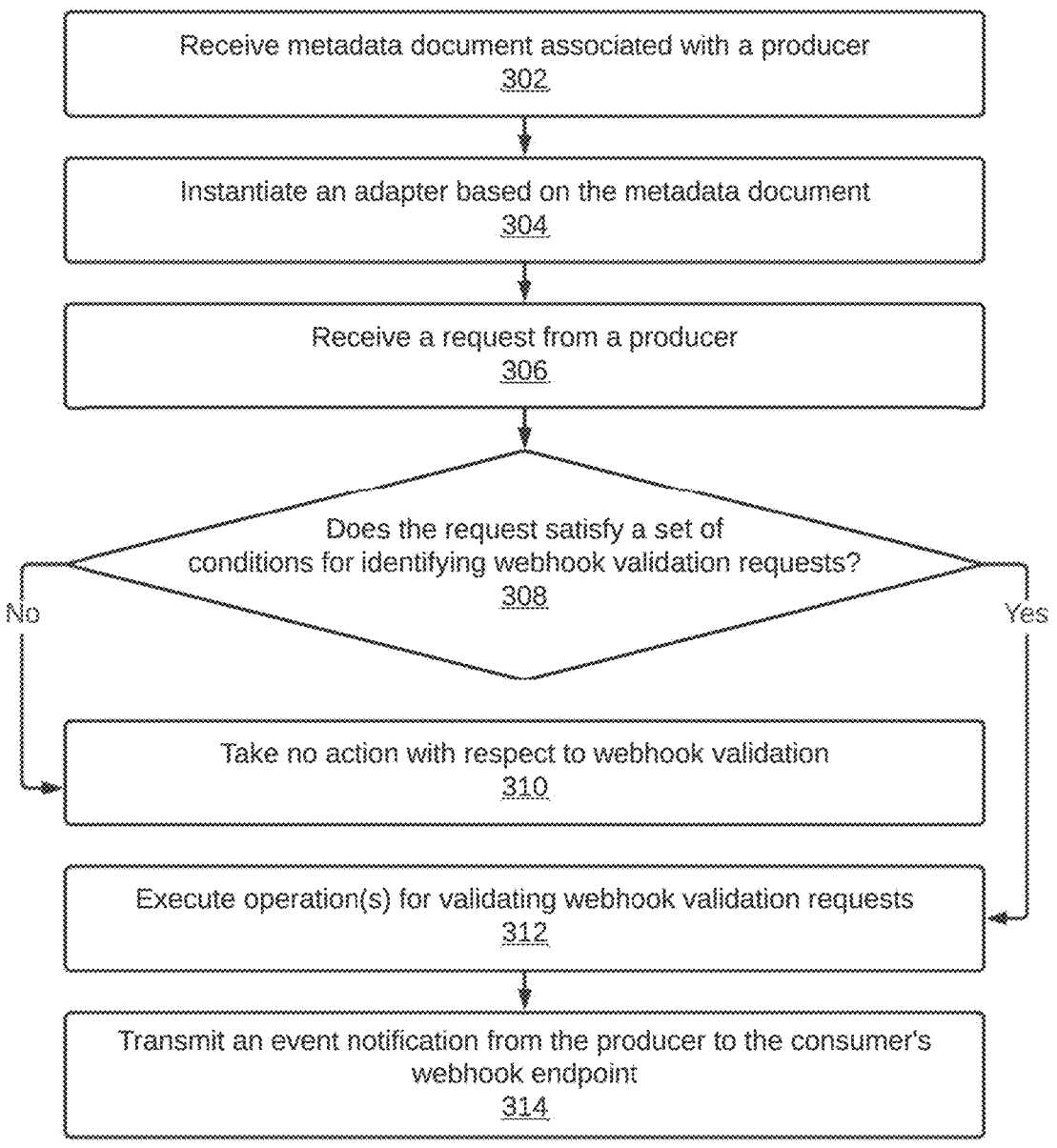
FIG. 3 illustrates an example set of operations for webhook registration using an RAB platform in accordance with one or more embodiments.

FIG. 3 illustrates an example set of operations for webhook registration in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, an integration platform receives a metadata document associated with a producer (Operation 302). The metadata document includes information that describes a set of conditions for identifying webhook validation requests. The metadata document further includes information that describes one or more operations for validating webhook validation requests. In an embodiment, the integration platform receives the metadata document from an integration developer. The metadata document may use a vocabulary for defining webhook registration adapters as described herein.

In an embodiment, the integration platform instantiates a webhook registration adapter based on the metadata document (Operation 304). Specifically, the integration platform instantiates the adapter using techniques described herein with respect to a rapid application building (RAB) platform. The RAB platform (which may be a component of the integration platform or a separate component) consumes the metadata document and produces the adapter.

In an embodiment, the integration platform receives a request from a producer (Operation 306). For example, the integration platform may expose a public API that is configured to receive requests. The requests may not all be of the same type. For example, some requests may correspond to webhook validation requests from producers while other requests may correspond to different types of actions.

In an embodiment, the integration platform determines if the request satisfies the set of conditions for identifying webhook validation requests (Operation 308). Specifically, for each condition that was described in the metadata document, the integration platform determines if the request satisfies that condition. A request is a webhook validation request if it satisfies all of the conditions (or a minimum subset of the conditions, if a condition is optional).

If the request does not satisfy the set of conditions for identifying webhook validation requests, then the integration platform takes no action with respect to webhook validation in connection with the webhook registration adapter (Operation 310). However, the request may satisfy a different set of conditions for identifying webhook validation requests associated with a different producer, and the integration platform may take action accordingly. Alternatively, the integration platform may take some other action such as generating an error message and transmitting the error message to the requestor.

If the request does satisfy the set of conditions for identifying webhook validation requests, then the integration platform executes the operation(s) for validating webhook validation requests (Operation 312). For example, the integration platform may execute a flow (e.g., a CNCF flow) defined by the set of operations. The flow implements the steps necessary to validate the request as described in the metadata document.

In an embodiment, executing the operation(s) completes the process of registering a consumer with the producer. The consumer is then treated as a subscriber to the producer and may subsequently receive event notifications from the producer. Specifically, when an event of interest (as indicated by the terms of the registration) occurs, the producer transmits an event notification to the consumer's webhook endpoint (Operation 314).

Figure 4:
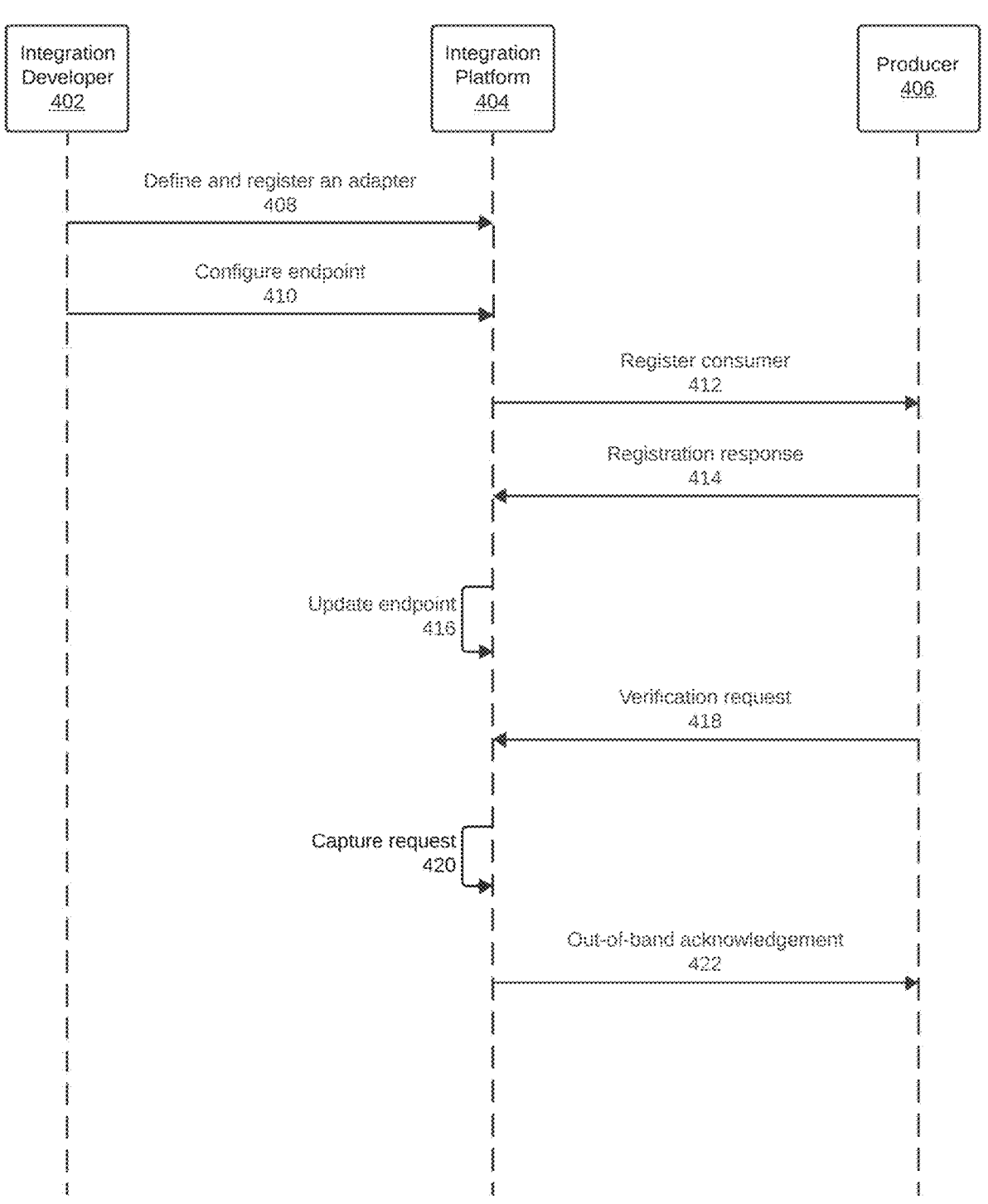
FIG. 4 illustrates an example set of operations for webhook registration using an RAB platform in accordance with one or more embodiments.

FIG. 4 illustrates an example set of operations for webhook registration in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, an integration platform 404 receives, from an integration developer 402, a metadata document that defines and registers a webhook registration adapter associated with a producer 406 (Operation 408). The metadata document includes information that describes a set of conditions for identifying webhook validation requests. The metadata document further includes information that describes one or more operations for validating webhook validation requests. In an embodiment, the integration platform receives the metadata document from an integration developer. The metadata document may use a vocabulary for defining webhook registration adapters as described herein.

In an embodiment, the integration platform 404 further receives, from the integration developer 402, information to configure a webhook endpoint for a consumer (not shown) (Operation 410). The information includes the location of the webhook endpoint (e.g., a public URL). The information may further include other information associated with the webhook endpoint.

In an embodiment, based on the data received from the integration developer 402, the integration platform 404 transmits a request to register the consumer with the producer 406 (Operation 412). The integration platform 404 may transmit the request to a webhook registration interface (e.g., a public API) exposed by the producer 406. The request includes information associated with the consumer's webhook endpoint, according to the producer API's specification.

In response to the registration request, the integration platform 404 receives a registration response (Operation 414) from the producer 406. The registration response includes information relevant to the registration, such as a shared secret, key, headers, origin location, subscription identifier and/or other relevant information. In an embodiment, the integration platform 404 uses this information for webhook authentication.

In an embodiment, based on the registration response, the integration platform 404 updates the webhook endpoint (Operation 416). The integration platform 404 may extract information from the registration response such as a shared secret, key, headers, origin location, subscription identifier and/or other relevant information. The information extracted may depend on the producer's 406 requirements. The integration platform 404 may store items of information securely according to their respective scope (e.g., security properties, connection properties, and/or integration state). The integration platform 404 may use some or all of this information when handling a verification request as described below, and/or when handling non-registration event notifications (i.e., actual webhook requests).

In an embodiment, the integration platform 404 receives a verification request from the producer 406 (Operation 418) and captures the verification request (Operation 420). In this context, the integration platform 404 "capturing" the verification request means that the verification request does not reach the consumer, even though the consumer's webhook endpoint is being registered.

In an embodiment, the integration platform 404 transmits an out-of-band acknowledgement to the producer 406 (Operation 422). The acknowledgement signifies that the verification request was valid, thus completing the process of registering the consumer with the producer 406. As described herein, the consumer can then begin receiving event notifications from the producer 406.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

As discussed above, one or more embodiments use a metadata document associated with a producer to describe a set of one or more operations for validating webhook validation requests. Specifically, one or more embodiments use flows (e.g., CNCF flows), as described herein, to define a set of operations to be performed for registration and verification. The metadata document (developed, for example, by an integration developer) may define the set of operations using an input execution context. A metadata processor (e.g., JQ) filters and extracts the required information from the execution context. Custom higher-order flow functions (e.g., higher-order JQ functions) perform actions such as (a) performing an outbound representational state transfer (REST) call (e.g., connectivity::rest), (b) retrieving security properties (e.g., connectivity::getSecurityProperty), and (c) updating security properties (e.g., connectivity::getSecurityProperty).

An integration developer may use a predefined vocabulary inside a webhook definition to link the operations to be performed for registration. The following is an example of a vocabulary for a subscription:

```
"subscription": {
    "register": "<flow>",
```

-continued

```
    }
}
```

The following is an example of a vocabulary for defining a trigger to be registered with the producer:

```
"triggers": {
    "XXXAppYYYYEventTrigger": {
        "subscription": {
            "register": "flow:registerFlow",
        }
    }
}
```

The following is an example of a vocabulary for a registration flow to register a webhook with a producer. The producer generates a secret and transmits the secret as part of the registration response. The flow parses the secret from the response and stores the secret for subsequent request validation:

```
"flows": {
  "registerFlow":{
  "id": "registerFlow",
  "description": "registerFlow",
  "version": "1.0",
  "start": "startState",
  "specVersion": "0.8",
  "functions": [
      {
        "name": "CreateSubscriptionFunction",
        "operation": "connectivity::rest",
        "type": "custom"
      },
      {
        "name": "updateSecret",
        "operation": "connectivity::updateSecurityProperty(.output.body.secret)",
        "type": "expression"
      }
  ],
  "states": [
      {
        "name": "startState"; "type": "operation", "end": true,
        "actions": [
            {
              "functionRef": {
                  "refName": "CreateSubscriptionFunction",
                  "arguments": {
                      "method": "PUT",
                      "uri": "https:/domain/context/uri",
                      "body": {
                          "param1": "${ .connectionProperties.param1Value }",
                          "param2": "${ .configuration.param2Value }"
                      }
                  }
              },
              "actionDataFilter": {
                  "results": "${ { body: .body, headers: .headers } }",
                  "toStateData": "${ .output }"
              }
            },
            {
              "functionRef": {
                  "refName": "updateSecret"
              }
            }
        ]
      }
  ]
}
```

The following table includes examples of object notations for defining a flow execution context for the registration process:

TABLE 1

| Context Object | Description | Dot(.) Notation | Example |
|---|---|---|---|
| Configuration | Additional configuration as part of actions/trigger from design-time | .configuration | .configuration.compartmentID |
| Connection Properties | Properties for connection configuration | .connectionProperties | .connectionProperties.baseUrl |
| Integration Properties | Properties identifying integration | .integrationProperties | .integrationProperties. INTEGRATION_FLOW_URL |
| Self | ADD reference (metadata document) | .self | .self.actions |

The following is an example of a vocabulary to define the operations for verification requests and their handling. The metadata document defines the conditions to identify a validation request and links the operations for handling the validation request:

```
"validationRequests": [
    {
        "condition": "<JQ evaluating true or false> ", "response": "<flow> "
    }
]
```

The following is a further example of a vocabulary for defining triggers associated with conditions and responses:

```
"triggers": {
    "XXXAppYYYYEventTrigger": {
        "validationRequests": [
            {
                "condition": ".request.headers.xxx==\"<verificationEvent>\"",
                "response": "flow:handleCloudEventsAbuseValidationRequest"
            },
            {
                "condition": ".request.method==\"OPTIONS\"",
                "response": "flow:handleCloudEventsAbuseValidationRequest"
            }
        ]
    }
}
```

The following is an example of a vocabulary for defining a flow for out-of-band validation:

```
"flows": {
    "validationFlow": {
        "id": "validationFlow",
        "description": "validationFlow",
        "version": "1.0",
        "start": "startState",
        "specVersion": "0.8",
        "functions": [
            {
```

-continued

```
                "name": "acknowledge",
                "operation": "connectivity::rest",
                "type": "custom"
            }
        ],
        "states": [
            {
                "name": "startState",
                "type": "operation",
                "end": true,
                "actions": [
                    {
                        "functionRef": {
                            "refName": "acknowledge",
                            "arguments": {
                                "method": "GET",
                                "uri": ${ .request.body.validationUrl },
                            }
                        },
                        "actionDataFilter": {
                            "results": "${ { status: .status, body: .body, headers: .headers } }",
                            "toStateData": "${ .output }"
                        }
                    }
                ]
            }
        ]
    }
}
```

The following table includes further examples of object notations for connection properties, input request, and configuration:

TABLE 2

| Context Object | | Description | Dot(.) notation | Example |
|---|---|---|---|---|
| Connection Properties | | Properties for connection configuration | .connectionProperties | .connectionProperties.baseUrl |
| Request | | Input Request | .request | .request.body//single valued.request.headers.token//array.request.headers.\ "x-custom\"[0] |
| | method | UpperCase HTTP method | | |
| | uri | Request URL | | |
| | Headers | Map of headers (header key is in lowercase). If multiple values, then array; else text. | | |
| | query | Map of query parameters. If multiple values, then array; else text | | |
| | body | Request body as String | | |
| Configuration | | Additional configuration as part of actions/trigger from design-time | .configuration | .configuration.compartmentId |

6. Practical Applications, Advantages & Improvements

One or more embodiments provide a webhook registration process that can be used in a variety of contexts. For example, one or more embodiments may be used to provide webhook integrations for enterprise applications (e.g., customer relationship management (CRM), online shopping, payment processing, etc.), social media and messaging applications, productivity platforms (e.g., project management, calendaring, etc.), and other kinds of applications that may benefit from webhook integrations. For example, webhooks may be used to automate business workflows between different applications. Webhooks may also be used to automate communication between component of a cloud service. Metadata-driven approaches described herein provide a low-code/no-code solution that does not require the developer to write custom logic.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
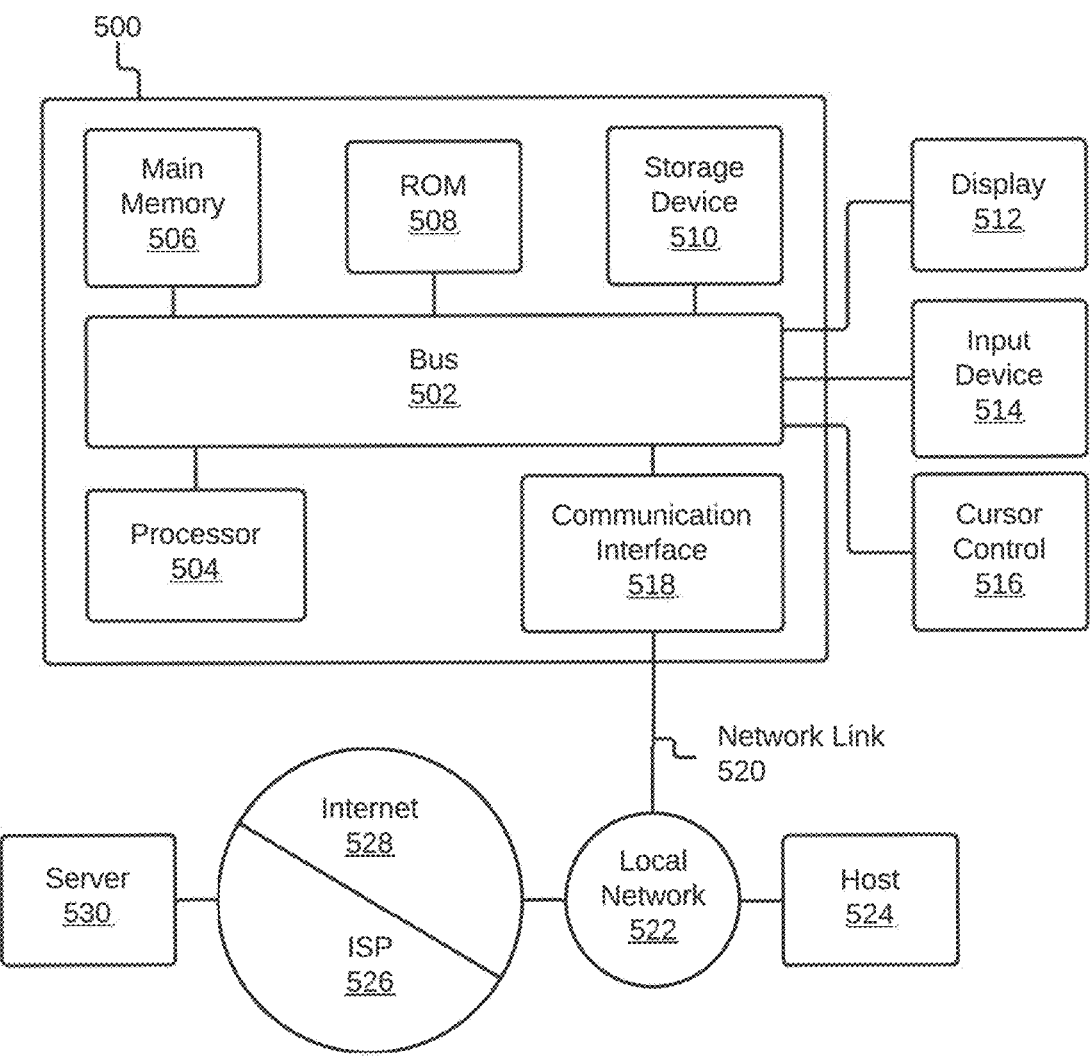
FIG. 5 shows a block diagram that illustrates a computer system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or a Solid State Drive (SSD) is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
instantiating, by an integration platform, a first adapter based on a first metadata document associated with a first producer, wherein the first metadata document describes (a) a first set of conditions for identifying webhook validation requests and (b) a first set of one or more operations for validating webhook validation requests;
wherein for a given request, satisfying the first set of conditions for identifying webhook validation requests indicates that the given request is a webhook validation request;
determining, by the integration platform using the first adapter, that a first request from a first producer satisfies the first set of conditions for identifying webhook validation requests;
responsive to determining that the first request satisfies the first set of conditions for identifying webhook validation requests: executing the first set of one or more operations for validating webhook validation requests, to validate a first registration of a first consumer with the first producer;
wherein the method is performed by at least one device including a hardware processor.

2. The method of claim 1, further comprising:
instantiating, by the integration platform, a second adapter based on a second metadata document associated with a second producer, wherein the second metadata document describes (a) a second set of conditions for identifying webhook validation requests and (b) a second set of one or more operations for validating webhook validation requests;
determining, by the integration platform using the second adapter, that a second request from a second producer satisfies the second set of conditions for identifying webhook validation requests;
responsive to determining that the second request satisfies the second set of conditions for identifying webhook validation requests: executing the second set of one or more operations for validating webhook validation requests, to validate a second registration of a second consumer with the second producer.

3. The method of claim 2, wherein the first set of conditions for identifying webhook validation requests is different than the second set of conditions for identifying webhook validation requests.

4. The method of claim 2, wherein the first set of one or more operations for validating webhook validation requests is different than the second set of one or more operations for validating webhook validation requests.

5. The method of claim 2, wherein:
the integration platform is a multi-tenant platform;
the integration platform receives the first request from a first tenant of the integration platform;
the integration platform receives the second request from a second tenant of the integration platform.

6. The method of claim 1, further comprising:
subsequent to validating the first registration of the first consumer with the first producer:
transmitting an event notification from the first producer to a webhook endpoint associated with the first consumer.

7. The method of claim 1, wherein the first metadata document is a JavaScript Object Notation (JSON) document.

8. One or more non-transitory computer-readable media comprising instructions which, when executed by one or more processors, cause performance of operations comprising:
instantiating, by an integration platform, a first adapter based on a first metadata document associated with a first producer, wherein the first metadata document describes (a) a first set of conditions for identifying webhook validation requests and (b) a first set of one or more operations for validating webhook validation requests;
wherein for a given request, satisfying the first set of conditions for identifying webhook validation requests indicates that the given request is a webhook validation request;
determining, by the integration platform using the first adapter, that a first request from a first producer satisfies the first set of conditions for identifying webhook validation requests;
responsive to determining that the first request satisfies the first set of conditions for identifying webhook validation requests: executing the first set of one or more operations for validating webhook validation requests, to validate a first registration of a first consumer with the first producer.

9. The one or more non-transitory computer-readable media of claim 8, the operations further comprising:
instantiating, by the integration platform, a second adapter based on a second metadata document associated with a second producer, wherein the second metadata document describes (a) a second set of conditions for identifying webhook validation requests and (b) a second set of one or more operations for validating webhook validation requests;
determining, by the integration platform using the second adapter, that a second request from a second producer satisfies the second set of conditions for identifying webhook validation requests;
responsive to determining that the second request satisfies the second set of conditions for identifying webhook validation requests: executing the second set of one or more operations for validating webhook validation requests, to validate a second registration of a second consumer with the second producer.

10. The one or more non-transitory computer-readable media of claim 9, wherein the first set of conditions for identifying webhook validation requests is different than the second set of conditions for identifying webhook validation requests.

11. The one or more non-transitory computer-readable media of claim 9, wherein the first set of one or more operations for validating webhook validation requests is different than the second set of one or more operations for validating webhook validation requests.

12. The one or more non-transitory computer-readable media of claim 9, wherein:

the integration platform is a multi-tenant platform;

the integration platform receives the first request from a first tenant of the integration platform;

the integration platform receives the second request from a second tenant of the integration platform.

13. The one or more non-transitory computer-readable media of claim 8, the operations further comprising:

subsequent to validating the first registration of the first consumer with the first producer:

transmitting an event notification from the first producer to a webhook endpoint associated with the first consumer.

14. The one or more non-transitory computer-readable media of claim 8, wherein the first metadata document is a JavaScript Object Notation (JSON) document.

15. A system comprising:

one or more hardware processors;

one or more non-transitory computer-readable media; and program instructions stored on the one or more non-transitory computer-readable media which, when executed by the one or more hardware processors, cause the system to perform operations comprising:

instantiating, by an integration platform, a first adapter based on a first metadata document associated with a first producer, wherein the first metadata document describes (a) a first set of conditions for identifying webhook validation requests and (b) a first set of one or more operations for validating webhook validation requests;

wherein for a given request, satisfying the first set of conditions for identifying webhook validation requests indicates that the given request is a webhook validation request;

determining, by the integration platform using the first adapter, that a first request from a first producer satisfies the first set of conditions for identifying webhook validation requests;

responsive to determining that the first request satisfies the first set of conditions for identifying webhook validation requests: executing the first set of one or more operations for validating webhook validation requests, to validate a first registration of a first consumer with the first producer.

16. The system of claim 15, the operations further comprising:

instantiating, by the integration platform, a second adapter based on a second metadata document associated with a second producer, wherein the second metadata document describes (a) a second set of conditions for identifying webhook validation requests and (b) a second set of one or more operations for validating webhook validation requests;

determining, by the integration platform using the second adapter, that a second request from a second producer satisfies the second set of conditions for identifying webhook validation requests;

responsive to determining that the second request satisfies the second set of conditions for identifying webhook validation requests: executing the second set of one or more operations for validating webhook validation requests, to validate a second registration of a second consumer with the second producer.

17. The system of claim 16, wherein the first set of conditions for identifying webhook validation requests is different than the second set of conditions for identifying webhook validation requests.

18. The system of claim 16, wherein the first set of one or more operations for validating webhook validation requests is different than the second set of one or more operations for validating webhook validation requests.

19. The system of claim 16, wherein:

the integration platform is a multi-tenant platform;

the integration platform receives the first request from a first tenant of the integration platform;

the integration platform receives the second request from a second tenant of the integration platform.

20. The system of claim 15, the operations further comprising:

subsequent to validating the first registration of the first consumer with the first producer:

transmitting an event notification from the first producer to a webhook endpoint associated with the first consumer.

* * * * *